July 10, 1962 H. F. RUNGE 3,042,963
SAUSAGE LINKING DEVICE
Filed April 12, 1960 2 Sheets-Sheet 1
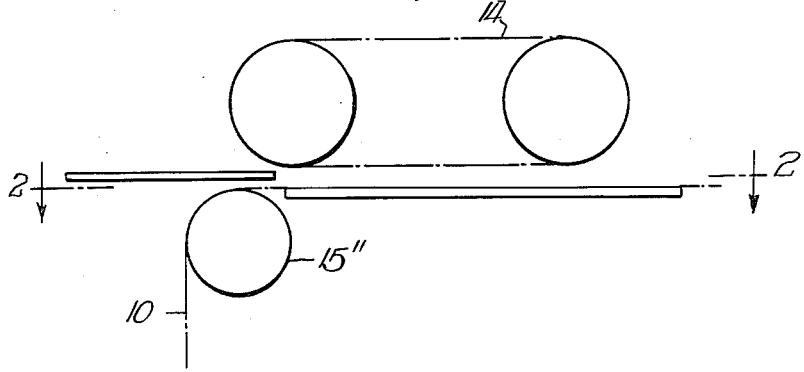
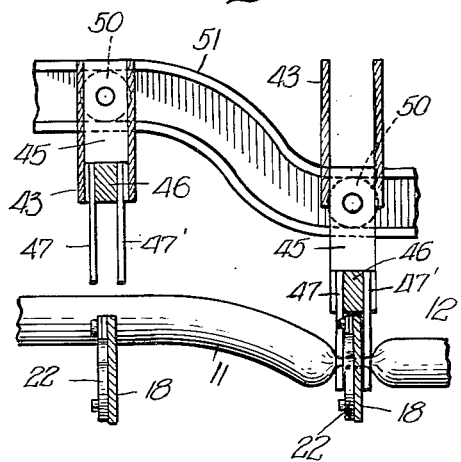
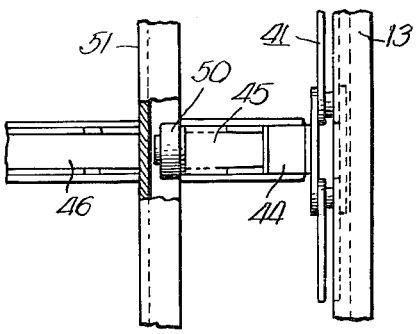
INVENTOR.
HEINZ F. RUNGE
BY Cromwell, Greist
and Warden
ATTORNEYS.

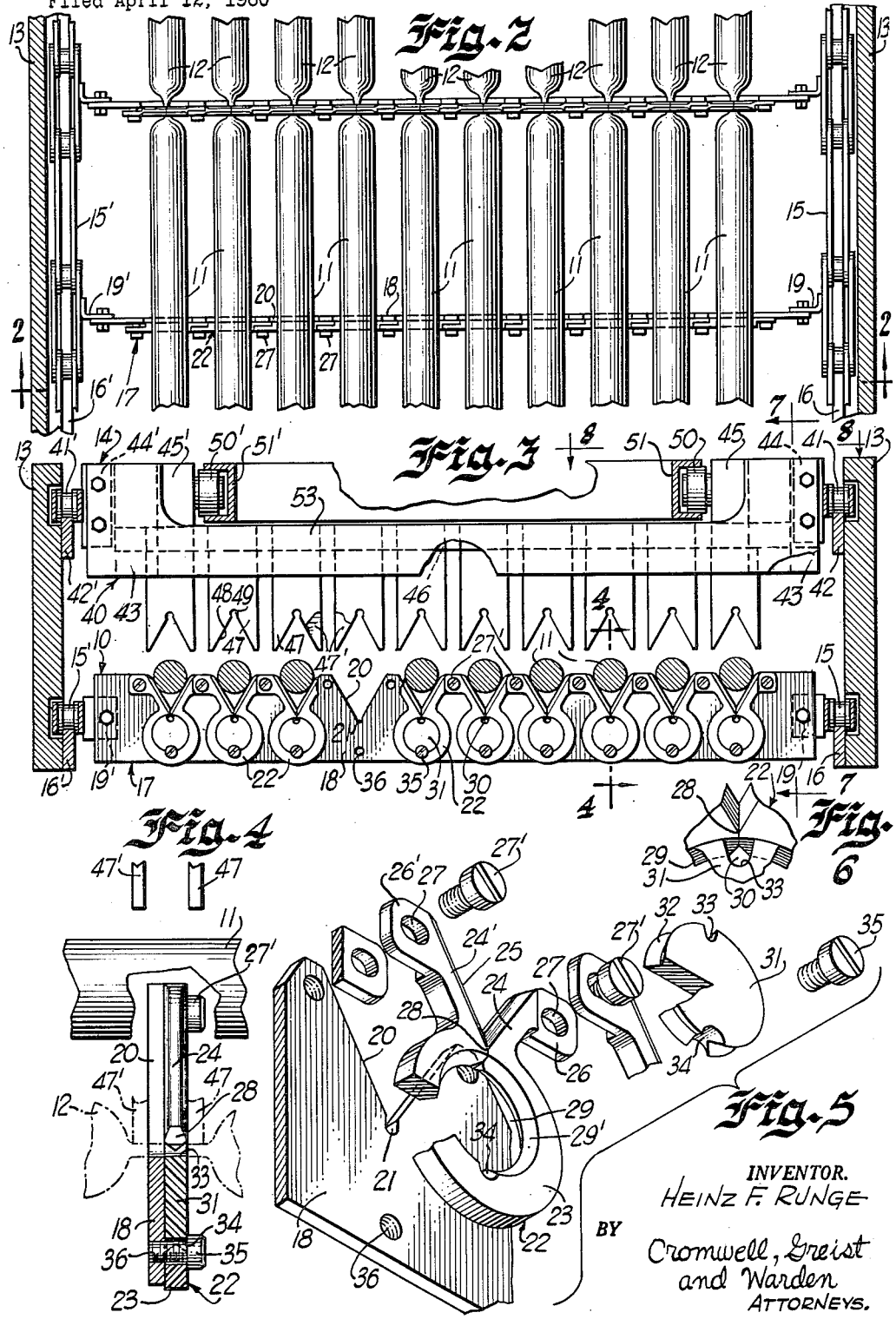

United States Patent Office 3,042,963
Patented July 10, 1962

1

3,042,963
SAUSAGE LINKING DEVICE
Heinz F. Runge, Madison, Wis., assignor to Oscar Mayer & Co., Inc., Chicago, Ill., a corporation of Illinois
Filed Apr. 12, 1960, Ser. No. 21,783
8 Claims. (Cl. 17—34)

This invention relates to the manufacture of sausages wherein relatively long lengths of filled or stuffed casings are divided into links by constricting the casing at intervals corresponding to the desired length of the sausages and thereafter carrying the links in connected relation through a series of chambers for smoking and cooking the same.

It is a general object of the invention to provide an improved device for dividing a stuffed sausage casing and forming links therefrom which is designed for incorporation in a linking and carrying conveyor of the type which is employed in the sausage linking and processing apparatus disclosed in copending application Serial No. 786,168, filed January 12, 1959 on which this is an improvement.

It is a more specific object of the invention to provide in a sausage linking and conveying apparatus wherein a plurality of lengths of stuffed casing are fed in parallel paths to a traveling conveyor on which the casings are divided into link forming sections and advanced to processing apparatus, a linking bar assembly for the conveyor which is constructed with a plurality of separable casing constricting and holding devices so that when an individual device is damaged or there is any malfunctioning thereof it may be readily removed for repair or replacement without removal from the conveyor of the entire linking bar assembly.

It is a still further object of the invention to provide in a sausage linking machine having a supporting and carrying conveyor comprising a series of longitudinally spaced cross bars each of which has a plurality of casing constricting devices thereon so as to adapt the conveyor to multiple line linking and carrying operations, with the casing constricting devices being individually mounted on the cross bars so as to permit removal and replacement thereof without dismantling the conveyor or removing any of the cross bars on which the devices are mounted.

These and other other objects and advantages of the invention will be apparent from a consideration of the apparatus which is shown by way of illustration in the accompanying drawings wherein:

FIGURE 1 is an elevation of a portion of a sausage linking and conveying apparatus which embodies the principal features of the invention, the apparatus being illustrated diagrammatically;

FIGURE 2 is a transverse view taken generally on the line 2—2 of FIGURE 1, to an enlarged scale, showing the sausage linking and carrying conveyor;

FIGURE 3 is a cross section taken generally on the line 3—3 of FIGURE 1 and illustrating one of the link forming and holding bar assemblies and associated mechanism with portions thereof broken away;

FIGURE 4 is a cross section, to an enlarged scale, taken on the line 4—4 of FIGURE 3;

FIGURE 5 is an exploded perspective view showing one of the link forming or casing constricting devices with portions thereof broken away;

FIGURE 6 is a fragmentary elevation showing the pocket in the link forming and constricting device in which the constricted casing is held on the link conveyor;

FIGURE 7 is a fragmentary section taken on the line 7—7 of FIGURE 3; and

2

FIGURE 8 is a fragmentary view taken on the line 8—8 of FIGURE 3.

Referring to the drawings, there is illustrated a portion of a continuously traveling endless chain conveyor 10 (FIGURE 1) which forms the link receiving and supporting carrier for an apparatus which is adapted to divide a plurality of lengths of stuffed sausage casings 11 (FIGURE 2) into link forming sections 12 and thereafter process the sausage links in a continuous operation. The conveyor 10 is an improvement over a similar conveyor in the link forming and processing apparatus illustrated in copending application Serial No. 786,168 to which reference may be had for details of the apparatus not hereinafter described.

The conveyor 10 has a horizontally disposed upper run or stretch at one end of the apparatus which is supported on an upright frame 13 (FIGURES 2 and 3), the latter also supporting a horizontally disposed auxiliary endless conveyor mechanism 14 (FIGURES 1 and 3) having a lower run which travels in a path parallel with and above the path of the conveyor 10 for a relatively short distance to form with the conveyor 10 what may be termed a linking station. The conveyor mechanisms 10 and 14 carry cooperating casing constricting or gathering devices 22 and 47, 47' (FIGURES 2 and 3) for dividing each of a plurality of lengths of stuffed sausage casings which are fed thereto in parallel laterally spaced relation into a connected series of link forming sections 12 which are held on the conveyor 10 and subsequently carried through the processing chambers by advancing movement of the conveyor.

The conveyor 10 on which the sausage links 12 are formed and carried comprises a pair of endless chains 15 and 15' which are arranged in transversely spaced, parallel relation and supported on suitable sprockets which are spaced throughout the apparatus and one of which is shown at 15" in FIGURE 1. The chains 15 and 15' are supported on guide rails 16 and 16' on the sides of the support frame 13 at the linking station, where the upper run of the conveyor 10 travels in a horizontal path. A plurality of cross bar assemblies 17 are carried between the chains 15 and 15' in longitudinally spaced relation with the spacing between the assemblies 17 corresponding to the length desired for the links 12. Each of the cross bar assemblies 17 comprises a single plate-like support bar 18 which is attached at its opposite ends to the chains 15 and 15' by the angle brackets 19 and 19'. The support bars 18 are arranged in transversely extending, parallel relation on the chains 15 and 15' and are spaced longitudinally according to the size link desired.

Each of the support bars 18 has a series of upwardly opening V-shaped slots 20 in its upper edge with the side edges of each slot converging downwardly and terminating at a bottom semi-circular pocket formation 21. The V-shaped slots 20 are equally spaced along the top edge of the support bar 18 and each slot 20 has associated therewith a casing gathering or neck forming and holding device 22 which is bolted or otherwise secured to the support bar 18 so that a series of the individual casing gathering or neck forming devices 22 are arranged along the length of the bar and when any one of these devices becomes damaged or fails to function properly it may be readily removed and replaced without any dismantling of the conveyor or the support bar 18.

The neck forming devices 22 are fabricated of a relatively flexible material, preferably a nylon or acetate type plastic, although other materials, such as rubber, may be used. Each neck forming device 22 comprises a plate-like member having an annular or ring-like bottom portion 23 and upwardly and outwardly angled arms 24 and 24' at the top thereof which form between them an upwardly opening V-shaped casing gathering slot 25. The arms 24 and 24' are formed at their upper ends with bracket-like wings or attaching pad members 26 and 26' which are provided with apertures 27 to permit the device to be secured to the support bar 18 by a pair of bolts 27'. The attaching pad members 26 and 26' are reduced to half thickness on opposite sides of the central plane of the device so that they may be lapped with the attaching pad members of the adjoining devices. The device is relatively thick and the V-shaped slot has its edges beveled inwardly of the faces of the device so that the upwardly and inwardly facing portions of the slot edges which are engaged by the stuffed casing are relatively narrow but of sufficient width to avoid cutting or tearing the casing. The downwardly converging edges defining the V-shaped slot 25 terminate at the bottom end of the slot at a vertical slit 28 which extends through the uppermost wall section of the annular bottom portion 23 of the device and into the center opening 29 therein. The slit 28 forms a passageway or opening through which constricted portions of the sausage casing may be forced into a necking pocket 30 below the same. The annular bottom portion 23 of the device acts as a spring hinge with the free ends of the jaws thereof being at the slit 28 which connects with the necking pocket 30, the upper arms 24 and 24' being adapted to spring outwardly of each other at the slit 28 when the stuffed casing is forced downwardly toward the slit 28 so that the latter opens up sufficiently to allow the gathered casing to pass into the pocket 30. The center opening or aperture 29 in the annular portion 23 of the device is adapted to receive a disc-like insert 31 which has a V-shaped peripheral edge 32 for cooperation with a V-shaped rib 29' formed in the internal wall forming edge around the aperture 29. The complementary V-shaped edges 29' and 32 cooperate to hold the insert 31 in place after it is once forced into the aperture 29. The insert 31 is cut away at 33 (FIGURES 4 to 6) on its periphery to form the lower part of the necking pocket 30 for receiving the constricted portion of the casing which is forced through the slit 28, the pocket 30 being located immediately beneath the slit 28 when the insert 31 is properly positioned in the aperture 29. An aperture 34 is cut in the edges of the insert 31 and the annular portion 23 of the device when the insert 31 is initially assembled in the aperture 29 and a set screw 35 is seated in the aperture 34 and engages in a cooperating threaded aperture 36 in the support bar 18, so as to prevent rotation of the insert 31 in the aperture 29 and also to further secure the device on the support bar 18.

Each of the bar assemblies 17 is provided with the same number of the casing constricting and holding devices 22 and the devices are aligned longitudinally of the conveyor.

The conveyor 14 is provided with a series of longitudinally spaced cross bar assemblies 40 which are secured between the side chains 41 and 41', the latter being supported on guide rails 42 and 42' fixed to the frame members 13. The cross bar assemblies 40 are mounted in parallel relation and longitudinally spaced in accordance with the spacing of the cross bar assemblies 17 on the conveyor 10 so as to cooperate with the cross bar assemblies 17 in forming the links 12 in the casings 11 when the bar assemblies 40 traverse the lower run of the conveyor 14. Each cross bar assembly 40 comprises a pair of spaced parallel frame plates 43 attached at opposite ends to bracket members 44 and 44' carried on the chains 41 and 41'. The bracket members 44 and 44' have vertical guideways for receiving slide blocks 45 and 45'. The slide blocks 45 and 45' are connected by a support bar 46 on which a plurality of pairs of depending spaced neck forming or casing constricting plates 47 and 47' are mounted. The neck forming plates 47 and 47' each have a downwardly opening inverted V-shaped slot 48 with the side edges converging upwardly toward each other and terminating in a rounded pocket forming recess 49 in the bottom of the slot. The pairs of neck forming plates 47 and 47' are spaced on the support bar 46 so that they align vertically with the neck forming devices 22 on the cross bar assemblies 17 as they are moved along parallel paths at the linking station by the chain conveyors 10 and 14. The two plates 47 and 47' of each pair thereof are spaced apart a sufficient distance to straddle the casing constricting device 22 with which they are aligned and the portion of the support plate 18 on which the device 22 is mounted as indicated in FIGURES 3, 4 and 7. The plates 47 and 47' are spaced along the length of their support bar 46 so as to provide space between adjoining plates for accommodating the heads of the screws or bolts 27'. The slide blocks 45 and 45' (FIGURES 3, 7 and 8) have cam rollers 50 and 50' mounted at their upper ends which engage in channel-shaped cam tracks 51, 51' extending longitudinally along the opposed runs of conveyors 10 and 11. The cam tracks 51, 51' have downwardly offset portions for imparting vertical movement to the casing constricting plates 47 and 47' by raising and lowering the support bar 46 as the plates advance with an aligned cross bar assembly 17 so as to force each casing 11 downwardly in a V slot 25 and through the slit 28 into the pocket 30.

In operating the apparatus the lengths of stuffed casing 11 are fed so that they are laid in the V-shaped slots 25 of the neck forming devices 22 and the latter are advanced by movement of the conveyor 10 to the linking station where they are disposed beneath the conveyor 14 and each successive neck forming assembly 40 on the conveyor 14 is moved into vertical alignment with an oncoming assembly 17 on the conveyor 10. The cross bar 46 is lowered by advance of the cam rollers 50, 50' in the cam tracks 51, 51' so as to force the stuffed casings down through the slits 28 and into the necking pockets 30 of the neck forming and holding devices 22 where the constricted portions of the casing are held by the neck forming and holding devices 22 while the constricting plates 47, 47' are raised by the cam tracks 51, 51' and the conveyor 10 advances the links 12 beyond the leading end of the lower run of the conveyor 14 and through the processing apparatus.

While particular materials and specific details of construction are referred to in describing the illustrated form of the invention, it will be understood that other materials and different details of construction may be employed within the spirit of the invention.

I claim:

1. In a machine for linking stuffed sausage casing, a movable support having cross bar assemblies which are spaced apart a distance corresponding to the length of link desired, said cross bar assemblies each comprising a support bar member having an upwardly opening V-shaped slot in the upper edge thereof, a casing constricting device mounted on said support bar member, said constricting device being formed of rubber-like material and comprising a plate-like member having an annular bottom portion with a central opening and a top portion formed by upwardly and outwardly directed arms defining between them an upwardly opening V-shaped slot, said device being mounted on the support bar member with the V-shaped slot alligned with the V-shaped slot in the support bar member, said annular bottom portion of said device having the central opening therein connected with the V-shaped slot between the upper arms thereof by a slit extending downwardly from the apex of said V-shaped slot and an insert seated in said central opening with a neck receiving pocket of relatively small size which is positioned at the lower end of said slit, said slit forming a passageway between the V-shaped slot and the neck receiving pocket which is adapted to be opened up by forcing a portion of a stuffed casing down into the V-shaped slot and through the passageway into the pocket where it is held in constricted relation by the resiliency of the material.

2. In a machine for linking stuffed sausage casing, a movable support having cross bar assemblies which are spaced apart a distance corresponding to the length of link desired, said cross bar assemblies each comprising a support bar member having an upwardly opening, generally V-shaped notch in its upper edge with a generally circular pocket at the bottom thereof, a casing constricting device mounted on said support bar at said V-shaped notch, said constricting device being formed of relatively stiff rubber-like material and comprising a plate-like member having a bottom portion in the form of a ring with an open center and a top portion providing upwardly and outwardly directed arms which define between them an upwardly opening generally V-shaped slot in which the stuffed casing is initially laid, said device being positioned on the support bar with the V-shaped slot and the V-shaped notch in alignment, said bottom ring having a slit in the top side thereof with the slit connecting the V-shaped slot between the upper arms thereof and the open center of the ring, and an insert seated in said ring and having a neck receiving pocket of relatively small size positioned at the lower end of said slit, said slit forming a passageway between the V-shaped slot and the neck receiving pocket when it is opened up by forcing a portion of a stuffed casing down into the V-shaped slot so as to constrict the casing and thereafter forcing the constricted casing portion throug the slit in the bottom ring and into the neck receiving pocket in the insert where it is held by the resiliency of the material.

3. In a machine for linking stuffed sausage casing, a movable support having cross bar assemblies which are spaced apart a distance corresponding to the length of link desired, said cross bar assemblies each comprising a support bar member having an upwardly opening notch in the upper edge thereof, a casing constricting and holding device mounted on said support bar, said constricting device being formed of material having substantial flexibility and comprising a plate-like member with an annular bottom portion with a central opening and a top portion with an upwardly opening V-shaped slot, said slot having its apex adjacent the top side of the annular bottom portion, said device being mounted on the support bar with the V-shaped slot aligned with the upwardly opening notch in the support bar, said annular bottom portion of said device having a slit in the top side thereof so as to connect the central opening in the annular portion with the bottom of the V-shaped slot in the upper portion thereof, and an insert seated in said central opening, said insert having a neck receiving pocket of relatively small size and being positioned to locate said neck receiving pocket at the lower end of said slit, said slit forming a passageway between the V-shaped slot and the neck receiving pocket which passageway is normally closed and which is opened up upon a portion of stuffed casing being forced down into the V-shaped slot and through said passageway into said neck receiving pocket where it is held by the resiliency of the material.

4. In a machine for linking stuffed sausage casing, a movable support having cross bar assemblies which are spaced apart a distance corresponding to the length of link desired, said cross bar assemblies each comprising a support bar having an upwardly opening notch in the upper edge thereof, a casing constricting device which is in the form of a rubber-like plate and which comprises an annular bottom portion with a central opening and a top portion with an upwardly opening V-shaped slot, said device being secured on the support bar with the V-shaped slot aligned with the notch in the support bar, said annular bottom portion of said device having a slit in the uppermost side thereof which extends from the bottom of the V-shaped slot through said uppermost side, and an insert seated in the central opening of said annular bottom portion and having a neck receiving pocket of relatively small size formed by a radially extending recess in the peripheral edge thereof which is located at the lower end of said slit, said slit forming a passageway between the V-shaped slot and the neck receiving pocket which is adapted to permit a portion of a stuffed casing to be forced downwardly into the V-shaped slot and through the passageway into the pocket where it is held by the resiliency of the material.

5. In a machine for linking stuffed casing, a traveling support having cross bars which are spaced apart a distance corresponding to the length of link desired, said cross bars each having one or more casing accommodating notches in the upper edges thereof which are aligned longitudinally with the notches in adjacent bars and a device adapted to be mounted on the bars at each said notch for constricting the casing between link forming sections thereof, said casing constricting device being formed of a rubber-like material and comprising a plate-like member having an annular bottom portion with a central opening and an upwardly extending generally V-shaped top portion providing an upwardly opening V-shaped slot which is aligned with a notch in the bar when the device is mounted thereon, said annular bottom portion having a slit at the juncture thereof with the top portion and the slit extending downwardly from the bottom of the V-shaped slot, a disc-like insert removably positioned in the central opening in the annular bottom portion and having a relatively small pocket forming recess in the peripheral edge which is positioned at the bottom end of said slit whereby to receive a constricted portion of said casing when said casing is forced downwardly into said V-shaped slot and through said slit.

6. In a machine for linking stuffed sausage casing, a traveling conveyor having cross bars which are spaced apart a distance corresponding to the length of link desired, said cross bars each having one or more casing accommodating notches in the upper edges thereof which are aligned longitudinally of the conveyor and each notch having an associated casing constricting and holding device, said casing constricting and holding device being plate-like and formed of a rubber-like material with an annular bottom portion and an upwardly facing V-shaped integral top portion, said top portion being secured to the cross bar with the V-shaped upwardly opening recess therein aligned with a casing accommodating notch, said annular portion having a slit where it joins the top portion and the slit extending from the bottom of the V-shaped recess through the uppermost side of the annular bottom portion, a disc-like insert frictionally retained in said annular bottom portion and having an outwardly opening semi-circular recess forming a relatively small pocket in the peripheral edge thereof, said insert being positioned with said edge recess at the bottom end of said slit whereby to receive a constricted portion of said casing when said casing is forced downwardly into said V-shaped slot and through said slit.

7. In a machine as recited in claim 6, and said casing and constricting device being secured to the cross bar at spaced points along its top edge and at a third point which is adjacent its bottom edge and which is intermediate the two top points.

8. In a machine for linking stuffed sausage casing, a traveling support having cross bars which are spaced longitudinally of the support a distance corresponding to the length of link desired, said cross bars having one or more casing accommodating top edge recesses which are aligned longitudinally and individual casing constricting and holding devices adapted to be mounted on the bars at each of said top edge recesses, said casing constricting and holding devices each being formed of a resilient plate-like material with a bottom portion of annular shape and an upwardly extending top portion of generally V-shape providing an upwardly opening generally V-shaped recess in the top portion thereof, said bottom portion having a slit at the juncture thereof with the top portion with the slit extending from the bottom of the V-shaped recess through the uppermost side of the annular bottom portion, a disc-like insert adapted to be frictionally held in said annular bottom portion and having a relatively small semi-circular pocket forming notch in the peripheral edge thereof, said insert being rotatably adjusted to position said notch at the bottom end of said slit whereby to receive a constricted portion of said casing when said casing is forced downwardly into said V-shaped slot and through said slit, and a fastening element engaging with said insert, said annular bottom portion and the cross bar for holding the device on the cross bar and for retaining the insert in adjusted position.

References Cited in the file of this patent

UNITED STATES PATENTS

| | | |
|---|---|---|
| 1,459,062 | Kruse | June 19, 1923 |
| 2,138,260 | Trabold | Nov. 29, 1938 |